United States Patent
Kulkaski et al.

(12) 
(10) Patent No.: US 9,840,613 B1
(45) Date of Patent: *Dec. 12, 2017

(54) ELASTOMERIC COMPOSITION HAVING HIGH IMPACT STRENGTH

(71) Applicant: K. JABAT, INC., Green Brook, NJ (US)

(72) Inventors: David Kulkaski, Piscataway, NJ (US); Thomas D. Simmering, Boonville, IN (US)

(73) Assignee: K. JABAT, INC., Green Brook, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/966,770

(22) Filed: Dec. 11, 2015

Related U.S. Application Data

(63) Continuation-in-part of application No. 13/998,088, filed on Sep. 30, 2013, now Pat. No. 9,453,310.

(60) Provisional application No. 61/797,042, filed on Nov. 28, 2012.

(51) Int. Cl.
*C08L 21/00* (2006.01)

(52) U.S. Cl.
CPC .................... *C08L 21/00* (2013.01)

(58) Field of Classification Search
CPC ................ C08L 21/00; C08L 47/00
USPC ..................... 524/525; 525/70, 86
See application file for complete search history.

(56) References Cited

U.S. PATENT DOCUMENTS

| | | | |
|---|---|---|---|
| 4,104,205 A | 8/1978 | Novotny et al. | 526/339 |
| 5,284,625 A | 2/1994 | Isayev et al. | 422/128 |
| 5,504,172 A | 4/1996 | Imuta | 526/351 |
| 5,602,186 A | 2/1997 | Myers et al. | 521/41 |
| 5,770,632 A | 6/1998 | Sekhar et al. | 521/41.5 |
| 5,955,547 A | 9/1999 | Roberts et al. | 525/285 |
| 6,046,279 A | 4/2000 | Roberts et al. | 525/285 |
| 6,525,157 B2 | 2/2003 | Cozewith et al. | 526/348 |
| 6,541,526 B1 | 4/2003 | Goldshtein et al. | 521/41 |
| 6,548,560 B1 | 4/2003 | Kovalak et al. | 521/41 |
| 6,831,109 B1 | 12/2004 | Beirakh et al. | 521/41 |
| 6,960,635 B2 | 11/2005 | Stevens et al. | 526/161 |
| 7,445,170 B2 | 11/2008 | Cialone et al. | 241/24.17 |
| 7,861,958 B2 | 1/2011 | Waznys et al. | 241/154 |
| 8,420,760 B2 | 4/2013 | Hughes et al. | 526/348 |
| 9,453,310 B1 * | 9/2016 | Kulkaski | E01F 9/04 |
| 2010/0317752 A1 | 12/2010 | Sekhar | 521/40 |

FOREIGN PATENT DOCUMENTS

| | | | |
|---|---|---|---|
| EP | 0964890 B1 | 10/2004 | C08F 23/16 |
| WO | WO00/01745 | 1/2000 | C08F 210/16 |
| WO | WO2009/067337 A1 | 5/2009 | C08F 210/06 |

* cited by examiner

*Primary Examiner* — Edward Cain
(74) *Attorney, Agent, or Firm* — Alvin T. Rockhill

(57) ABSTRACT

This invention relates to rubber formulations which are useful as a structural material for utilization in manufacturing a wide variety of articles having a unique combination of rigidity, strength and flexural properties while maintaining excellent impact strength and durability. Additionally, articles made with the rubber formulations of this invention can essentially return to their original shape after being deformed by being impacted with a foreign object. A polymeric formulation which is useful as a structural material for manufacturing a wide variety of articles, said polymeric formulation being comprised of (1) about 45 weight percent to about 85 weight percent of a micronized rubber powder, (2) from about 15 weight percent to about 45 weight percent of a metallocene polyolefin elastomer, and (3) from about 1 weight percent to about 10 weight percent of a maleic anhydride grafted polyethylene.

23 Claims, 2 Drawing Sheets

ELASTOMERIC COMPOSITION HAVING HIGH IMPACT STRENGTH

This is a continuation-in-part of U.S. patent application Ser. No. 13/998,088, filed on Sep. 30, 2013, which claims the benefit to the priority of U.S. Provisional Patent Application Ser. No. 61/797,042, filed on Nov. 28, 2012. The teaching of U.S. patent application Ser. No. 13/998,088 are incorporated herein in their entirety.

FIELD OF THE INVENTION

The present invention relates generally to a polymeric composition which can be utilized in manufacturing a wide variety of articles of manufacture. This polymeric composition offers an excellent combination of tensile strength, flexural modulus, and impact strength and is made with a large quantity of micronized rubber powder from recycle streams, such as discarded tires and industrial rubber products. One embodiment of the present invention relates to materials and compounds using micronized or pulverized rubber powder as a component to enhance the physical properties or reduce cost of finished products, such as tuber or flat strips in highway delineators, road markers, utility line markers, and vent tubes, for example the vent tubes used on Port-A-Johns).

BACKGROUND OF THE INVENTION

Millions of used tires, hoses, belts and other rubber products are discarded annually after they have been worn-out during their useful service life. These used rubber products are typically hauled to a dump or simply burnt as fuel after they have served their original intended purpose. A limited number of used tires are utilized in building retaining walls, as guards for protecting boats, and in similar applications. Some tires are ground into powder form to be used in various applications, such as tire compounds, binders for asphalt, mulch, fillers for a variety of low performance rubber products, sports field and playground applications, and the like. However, a far greater number of tires, hoses and belts are simply discarded or burnt.

The recycling of cured rubber products has proven to be extremely challenging and problematic. Recycling cured rubber products (such as, tires, hoses and belts) is problematic because, in the vulcanization process, the rubber becomes crosslinked with sulfur into a formed structure. The sulfur crosslinks are very stable and the vulcanization process is extremely difficult to reverse. After vulcanization, the crosslinked rubber becomes thermoset and cannot easily be reformed into other products. In other words, the cured rubber cannot be melted and reformed into other products like metals or thermoplastic materials. Thus, cured rubber products cannot be simply melted and easily recycled into new products.

Since the discovery of the rubber vulcanization process by Charles Goodyear in the nineteenth century, there has been interest in the recycling of cured rubber. A certain amount of cured rubber from tires and other rubber products is shredded or ground to a small particle size and incorporated into various products, including rubber products, as a type of filler. For instance, ground rubber can be incorporated into asphalt for surfacing roads or parking lots. Small particles of cured rubber can also be included in rubber formulations for new tires and other rubber products. However, it should be understood that such recycled rubber which has simply been ground to a small particle size serves only in the capacity of a filler because it was previously cured and does not bond to an appreciable extent to the virgin rubber in the rubber formulation. Therefore, recycled rubber is typically limited to lower loadings due to poor compound processing (compounds become drier with higher loadings) as well as higher loadings leading to unacceptable cure properties. Rubber compositions which contain high levels of ground rubber from previously cured products also typically have compromised physical characteristics, such as lower tensile strength, lower impact strength, low abrasion resistance, and the like. These problems have accordingly greatly limited the quantity of ground rubber from recycled products which can be incorporated into new rubber products.

Various techniques for devulcanizing cured rubber have been developed. Devulcanization offers the advantage of rendering the rubber suitable for being reformulated and recured into new rubber articles if it can be carried out without degradation of the rubber. In other words, the rubber could again be used for its original intended purpose. However, none of the devulcanization techniques previously developed have proven to be commercially viable at high loadings. For example, some devulcanized materials may be used at loadings of 3-5%. However, above this level the properties of the new rubber article are diminished. This renders them unsuitable for high performance applications, such as vehicle tires, power transmission belts, conveyor belts, hoses, windshield wiper blades, and the like. In other cases, the devulcanized materials are unsuitable for processing at high loadings into rubber compounds. These processing challenges can include short cure times (scorch), too little tack, too high of a viscosity, and poor mill handling and extrusion quality. A renewable material that can be used in high performance applications at loadings of 5% and higher is accordingly needed so that recycled rubber can be used in manufacturing products having higher demands on performance.

U.S. Pat. No. 4,104,205 discloses a technique for devulcanizing sulfur-vulcanized elastomer containing polar groups which comprises applying a controlled dose of microwave energy of between 915 MHz and 2450 MHz and between 41 and 177 watt-hours per pound in an amount sufficient to sever substantially all carbon-sulfur and sulfur-sulfur bonds and insufficient to sever significant amounts of carbon-carbon bonds.

U.S. Pat. No. 5,284,625 discloses a continuous ultrasonic method for breaking the carbon-sulfur, sulfur-sulfur and, if desired, the carbon-carbon bonds in a vulcanized elastomer. Through the application of certain levels of ultrasonic amplitudes in the presence of pressure and optionally heat, it is reported that cured rubber can be broken down. Using this process, the rubber becomes soft, thereby enabling it to be reprocessed and reshaped in a manner similar to that employed with previously uncured elastomers.

U.S. Pat. No. 5,602,186 discloses a process for devulcanizing cured rubber by desulfurization, comprising the steps of: contacting rubber vulcanizate crumb with a solvent and an alkali metal to form a reaction mixture, heating the reaction mixture in the absence of oxygen and with mixing to a temperature sufficient to cause the alkali metal to react with sulfur in the rubber vulcanizate and maintaining the temperature below that at which thermal cracking of the rubber occurs, thereby devulcanizing the rubber vulcanizate. U.S. Pat. No. 5,602,186 indicates that it is preferred to control the temperature below about 300° C., or where thermal cracking of the rubber is initiated. Toluene, naphtha, terpenes, benzene, cyclohexane, diethyl carbonate, ethyl acetate, ethylbenzene, isophorone, isopropyl acetate, methyl ethyl ketone and derivatives thereof are identified as solvents that can be used in the process disclosed by this patent.

U.S. Pat. No. 6,548,560 is based upon the discovery that cured rubber can be devulcanized by heating it to a temperature of at least about 150° C. under a pressure of at least about $3.4 \times 10^6$ Pascals in the presence of a solvent selected from the group consisting of alcohols and ketones having a critical temperature within the range of about 200° C. to about 350° C. The molecular weight of the rubber can be maintained at a relatively high level if the devulcanization is carried out at a temperature of no more than about 300° C. This devulcanization technique is reported to not significantly break the polymeric backbone of the rubber or to change its microstructure. In other words, the devulcanized rubber can be recompounded and recurred into useful articles in substantially the same way as was the original (virgin) rubber. This patent more specifically reveals a process for devulcanizing cured rubber into devulcanized rubber that is capable of being recompounded and recurred into useful rubber products, said process comprising (1) heating the cured rubber to a temperature which is within the range of about 150° C. to about 300° C. under a pressure of at least about $3.4 \times 10^6$ Pascals in the presence of a solvent selected from the group consisting of alcohols and ketones, wherein said solvent has a critical temperature which is within the range of about 200° C. to about 350° C., to devulcanize the cured rubber into the devulcanized rubber thereby producing a slurry of the devulcanized rubber in the solvent; and (2) separating the devulcanized rubber from the solve.

U.S. Pat. No. 5,770,632 discloses a process for reclaiming elastomeric material from elemental sulphur-cured elastomeric material having a vulcanized network without using hexamethylene tetramine, by treating the sulphur-cured elastomeric material having a vulcanized network with one or more rubber delinking accelerators selected from the group of zinc salts of thiocarbamates and zinc salts of dialkyl dithiophosphates, 2-mercaptobenzothiazole or derivatives thereof, thiurams, guanidines, 4,4'-dithiomorpholine and sulphenamides, and a zinc oxide activator in an amount sufficient to act as an activator for the accelerator(s) to delink the elastomeric material at a temperature below 70° C., whereby the vulcanized network is opened up or delinked to provide a curable reclaimed elastomeric material capable of being vulcanized without adding rubber vulcanizing chemicals. The technique described in this patent also includes compositions capable of delinking the vulcanized network of sulphur-cured elastomeric materials including the accelerators and activator described above. The obtained recycled, or reclaimed, elastomeric material has desired physical and dynamic characteristics that render it suitable for use in molded goods or for admixture with fresh compounds in tires and related products.

U.S. Pat. No. 6,831,109 described a modifier for devulcanization of cured elastomers, and especially vulcanized rubber, said modifier containing a first chemical substance, which is disposed towards on and the formation of an organic cation and amine, and further containing a second chemical substance as promoter of dissociation of the first chemical substance, said promoter containing a functional group constituting an acceptor of said amine.

U.S. Pat. No. 6,541,526 describes a mechanical/chemical method composition for the de-vulcanization of rubber is reported to maintain the macromolecules in the composition and to render the sulfur therein passive for later re-vulcanization. This process is also reported to be cost effective, environmentally friendly and to produce high quality devulcanized rubber to replace virgin rubber. According to the method of U.S. Pat. No. 6,541,526 waste rubber is shredded, crushed and metal is removed. Then the modifying composition is added as the particles of shredded waste rubber are poured between two rollers that further crush the particles. The modifying composition is a mixture of ingredients which include, by weight, the following components: (1) between approximately 76% and approximately 94% of a proton donor that breaks sulfur to sulfur bonds in the waste rubber; (2) between approximately 1% and approximately 5% of a metal oxide, (3) between approximately 1% and approximately 5% of an organic acid having between 16 and 24 carbon atoms per molecule, (4) between approximately 2% and approximately 10% of a vulcanization inhibitor and (5) between approximately 2% and approximately 10% of a friction agent.

United States Patent Application Publication No. 2010/0317752 described a method which is reported to be effective in recycling vulcanized elastomeric materials via a cost effective devulcanization process which opens up or "delinks" the crosslinks of the vulcanized network structure in used vulcanized elastomers without unduly degrading the backbone of the rubbery polymer. This patent more specifically discloses a delinking composition in the form of a combined solid dose comprising: (i) one or more elastomer delinking accelerators selected from the group consisting of zinc salts of thiocarbamates and zinc salts of dialkyl dithiophosphates; and (ii) one or more elastomer delinking accelerators selected from the group consisting of 2-mercaptobenzothiazole or derivatives thereof, thiurams, guanidines, 4,4'-dithiomorpholine and sulpenamides; and (iii) at least one elastomer delinking activator. However, this patent absolutely requires as essential ingredients zinc salt, an elastomer delinking accelerator and a delinking activator.

None of the techniques described in these foregoing patents have proven to be commercially viable and the recycled rubber made by these processes have not proven to be feasible for use at high loadings in value added applications, such as tires, conveyor belts, power transmission belts, hoses, air springs, windshield wiper blades, and the like. In fact, to date very little characterization data has been presented to substantiate statements regarding the selectivity of sulfur-sulfur or sulfur-carbon bonds being broken instead of carbon-carbon bonds within the vulcanized rubber compound network. Accordingly, the suitability of any of these recycled rubbers as a direct replacement for virgin rubber in manufacturing new rubber products has not been substantiated.

Cured rubber articles can successfully be ground into a powder and used in manufacturing a wide variety of products. For instance, reclaimed elastomeric materials, such as reclaimed elastomers, ground tire rubber (GTR), and micronized rubber powders (MRP), which include vulcanized elastomeric materials, are used in a variety of products. For instance, micronized rubber powders are commonly used as fillers in rubber, asphalt, and plastic articles. More specifically, micronized rubber powders are presently being utilized as fillers in tires, industrial rubber products (hoses, power transmission belts, conveyor belts, floor mats), asphalt products (paving formulations and roofing shingles) and a wide array of other products. The utilization of reclaimed elastomers in such rubber products is typically significantly less expensive than using virgin materials and leads to an overall reduction in manufacturing costs. The use of reclaimed material is also environmentally advantageous in that it prevents the cured rubber recovered from postconsumer and industrial sources from going to landfills or simply being burned. Finally, the use of recycled ground tire rubber and micronized rubber powders provides a strategic supply chain hedge against petroleum-based supply chain price and supply volatility.

Today, devulcanized rubber material known as reclaim exhibits excellent processability but poor cure properties in compounds at loadings above 3-5%. Micronized rubber powder (MRP) shows acceptable cure properties, yet at higher loadings (above 5%), compound processability begins to suffer.

Generally, ground tire rubber (GTR) consists of particle size distributions that range from a diameter of about 0.5 mm to about 5 mm which can be produced by a variety of techniques including ambient temperature and cryogenic grinding methods. Micronized rubber powders (MRP) typically contain a significant fraction of rubber particles having a particle size of less than 100 microns. In any case, ground tire rubber and micronized rubber powders are commonly designated by mesh size. For example, powders in the size range of 10-30 mesh normally are considered to be ground tire rubber while powders having a smaller particle size which is within the range of 40-300 mesh are generally considered to be micronized rubber powder. Micronized rubber powder is typically more expensive to make by virtue of requiring more processing and/or more demanding processing conditions to attain the smaller particle size. For this reason, ground tire rubber is typically used in low performance applications, such as floor mats, with micronized rubber powder only being utilized in more demanding applications, such as tires, where the additional cost can be justified.

The reclaimed elastomeric polymers which are used as the raw material for making ground tire rubber and micronized rubber powder, such as scrap tire rubber, are cured (previously vulcanized) rubbers. They are accordingly relatively inert particles which are essentially non-reactive with virgin elastomers, which results in compromised processing and properties at high loadings. The use of such reclaimed rubbers in manufacturing new rubber products often leads to a compromised level abrasion resistance which greatly limits the level at which they can be incorporated into products which are subjected to abrasive forces during their service life, such as tire tread formulations, windshield wiper blades, and conveyor belts, and the like.

Even though many uses for recycled rubber have been developed over the years there remains a need for using recycled rubber in large quantities in high performance applications. In other words, there is a long-felt but unresolved need for applications in which ground tire rubber and micronized rubber powders can be used in large quantities in manufacturing high performance articles of manufactured. In other words, it would be highly desirable for these products to have the attributes of those which are at least as good or better than those made utilizing virgin rubber.

SUMMARY OF THE INVENTION

This invention relates to rubber formulations which are useful as a structural material for utilization in manufacturing a wide variety of articles having excellent impact strength and tensile strength. These articles of manufacture can be made to have a unique combination of rigidity, strength and flexural properties while maintaining excellent impact strength and durability. Additionally, articles made with the rubber formulations of this invention can essentially return to their original shape after being deformed by being impacted with a foreign object. The rubber formulations of this invention can accordingly be used in making various articles of manufacture having a highly desirable combination of physical properties which can provide them with beneficial characteristics which could not otherwise be attained. For instance, the rubber formulations of this invention are of particular value in vehicle mud flaps, tuber or flat strips for highway delineators, road markers, utility line markers, vent tube, and the like.

The subject invention more specifically reveals a polymeric formulation which is useful as a structural material for manufacturing a wide variety of articles of manufacture, said polymeric formulation being comprised of (1) about 45 weight percent to about 85 weight percent of a micronized rubber powder, (2) from about 15 weight percent to about 45 weight percent of a metallocene polyolefin elastomer, and (3) from about 1 weight percent to about 10 weight percent of a maleic anhydride grafted polyethylene.

The present invention further reveals an extrudable flexible composition for use in articles which return to their original shape when deformed comprising: between 1 weight percent and 90 weight percent of a micronized rubber powder, a polyolefin-based elastomer, and a compatabilizer. In these compositions the polyolefin-based elastomer will typically be a polyethylene-based elastomer or a polypropylene-based elastomer. It is generally preferred for the polyolefin-based elastomer to be a metallocene polyolefin elastomer, such as a metallocene polyethylene elastomer or a metallocene polypropylene elastomer. The micronized rubber powder will typically be a mixture of natural rubber and various synthetic rubbers, including synthetic polyisoprene rubber, emulsion styrene-butadiene rubber, solutions styrene-butadiene rubber, high cis-1,4-polybutadiene rubber, styrene-isoprene-butadiene rubber, and the like. In one embodiment of this invention, the micronized rubber powder is present in the extrudable flexible composition at a level which is within the range of 45 weight percent to about 85 weight percent and is preferably present at a level which is within the range of 60 weight percent to about 80 weight percent. The compatabilizer can be a mixture of light color aliphatic hydrocarbon resins or a maleic anhydride grafted polyolefin, such as a maleic anhydride grafted polyethylene or maleic anhydride grafted polypropylene.

The subject invention also discloses an extrudable durable composition which retains its shape in finished products comprising: about 40 weight percent to 60 weight percent of a micronized rubber powder, about 10 weight percent to about 50 weight percent of a polyolefin-based elastomer, about 1 weight percent to about 10 weight percent of a compatabilizer, and about 1 weight percent to about 5 weight percent of a color concentrate. In these compositions the polyolefin-based elastomer will typically be a polyethylene-based elastomer or a polypropylene-based elastomer. It is generally preferred for the polyolefin-based elastomer to be a metallocene polyolefin elastomer, such as a metallocene polyethylene elastomer or a metallocene polypropylene elastomer. The micronized rubber powder will typically be a mixture of natural rubber and various synthetic rubbers, including synthetic polyisoprene rubber, emulsion styrene-butadiene rubber, solutions styrene-butadiene rubber, high cis-1,4-polybutadiene rubber, styrene-isoprene-butadiene rubber, and the like. The compatabilizer can be a mixture of light color aliphatic hydrocarbon resins or a maleic anhydride grafted polyolefin, such as a maleic anhydride grafted polyethylene or maleic anhydride grafted polypropylene.

One aspect of the subject invention is based upon the discovery of how to manufacture road markers and highway delineators from a compounded mixture of polymers and pulverized or micronized rubber powder, using a multi-layer plastic extrusion process on industry standard extrusion equipment.

Utility line markers, road markers and highway safety delineators are used along roads and highways to mark road boundaries, exits, and underground service pipes or cables. The problems with current delineators is their limited ability to be impacted by a vehicle, such as an automobile or truck, traveling at 55 mph (miles per hour) or even faster or farm implements, and to return to the vertical position at cold or elevated temperatures. The cost of delineators or posts of current design: ranging from standard commodity thermoplastics to expensive performance based polymers, such as TPU (thermoplastic polyurethane) is reduced in the practice of this invention by using available lower cost, recycled tire and scrap rubber powder sources.

The finished tube or flat delineator is protected from deteriorating from ultra-violet rays from the sun by a multi-layer thin cap coat cover of a polymer and color concentrate. One aspect of this invention is based upon the discovery that the blending of various levels of micronized/non-micronized rubber; recycled and or virgin blends into a formulated array of thermoset/thermoplastic blends to achieve economic performance results for impact regardless shape, attachment method or spring back mechanisms. The micronized rubber particles act as a filler to make an un-extrudable thermoset/thermoplastic blend more viscous and thus extrudable. It is the excellent filler loading acceptance and the elasticity performance nature of Vistamax 3020 or equivalent (propylene-based elastomer, using ExxonMobil Chemical's EXXPOL catalyst technology or equivalent that provides the desired characteristics.

One aspect of this invention is based upon the use of a mixture of light-colored aliphatic resins to improve the homogeneity of elastomers of different polarity and viscosity during the mixing cycle. Such a mixture of light-colored aliphatic resins is commercially available from Struktol Company of Ameerica of Stow, Ohio and is sold as Struktol® RP 28 which has a softening point of 95-105° C. and a specific gravity of 0.97.

In one embodiment of this invention a rubber/thermoplastic blend is used in a delineator base applications wherein the blend provides an economic advantage over virgin rubber and also enables a stronger chemical bond (with the use of compatibilizers) with the butyl adhesive or epoxy that is used to adhere the base of the delineator to the pavement.

Another object of the subject invention is the provision of a reduced and sustainable carbon foot print of emissions for virgin rubber and the repurposing of some of the large amount of tire scrap accumulating each year around the world. Another object of the present invention is the provision of a composition which itself is recyclable so that, for example, a highway delineator can be recycled by being blended back into new delineator without loss of performance in the new delineators.

Another object of the subject invention is the provision of a composition which can be formed into an elongated flexible tube or profile of resilient thermoplastic/thermoset plastics filled with a rubber blend filler. Another object of the subject invention is the provision of as composition which can be extruded into a shape and which is then capable of being repetitively bent through an angle of 90° and of returning to an upright straight position. In order to duplicate impact testing results 90° flexure was tested via a modified test apparatus using the ASTM D2444-99 test procedure. The falling TPU test utilized a 20 pound, smooth face TPU, dropped repetitively from a height of 11 feet, impacting and passing through the horizontal test sample 18 inches from the mounted base and flexing it to a 90° bend. The velocity of the impact was calculated to be 57 mph (miles per hour). The test specimens measured 42 inches in length. The delineator continuously returned to origin. Another object of the invention is the provision of a formed performance base for highway delineators consisting of a resilient thermoplastic/thermoset plastic filled with micronized rubber blend filler. Another object of the present invention is the provision of a composition which can be used in existing mechanical designs without modification of existing form, fit, and function.

One embodiment of this invention is directed to a compounded blend of materials which can be used to make all existing delineator structures as well as new designs. These blends include a matrix of micronized rubber particles (either virgin or recycled) ranging from 1% to 90% load capacity depending on performance desired enveloped into a blend of thermoplastic or thermoset polymer blends. The theory behind the envelopment of rubber particles into a thermoplastic or thermoset blend is to provide the viscosity required to extrude the material through existing, conventional extrusion and sizing equipment. In addition, the micronized rubber powder will act as a filler reducing cost of performance related thermoplastics/thermosets without reducing performance. This invention may or may not utilize a cap stock material to enable processing of the performance portion of the internal blend mix. The cap stock material may also serve as a means to reduce color concentrate cost required to customize the tube per customer specifications. The cap stock material may also be used for the adhesion of reflective tape, in addition to UV protection.

Another object of the present invention is the provision of a cost effective performance based rubber/thermoplastic blend in the manufacturing of the base. It is noted that virgin rubber is an expensive solution for the impact properties desired and performance required. The compounded blend will still offer comparable performance results at an economical value.

Another purpose of the present invention is the provision of a compounded blend that will enable a successful performance drive over test for a utility line marker. An attribute needed for underground line markers, used in the utility industry for identifying the location of underground lines. Numerous underground utility line markers are damaged by farm implements that knock the existing line markers over thereby eliminating their visual purpose. The blend of the subject invention allows the line markers to rebound back to a vertical position to remain visible for their intended purpose.

DETAILED DESCRIPTION OF THE INVENTION

Figure 1:
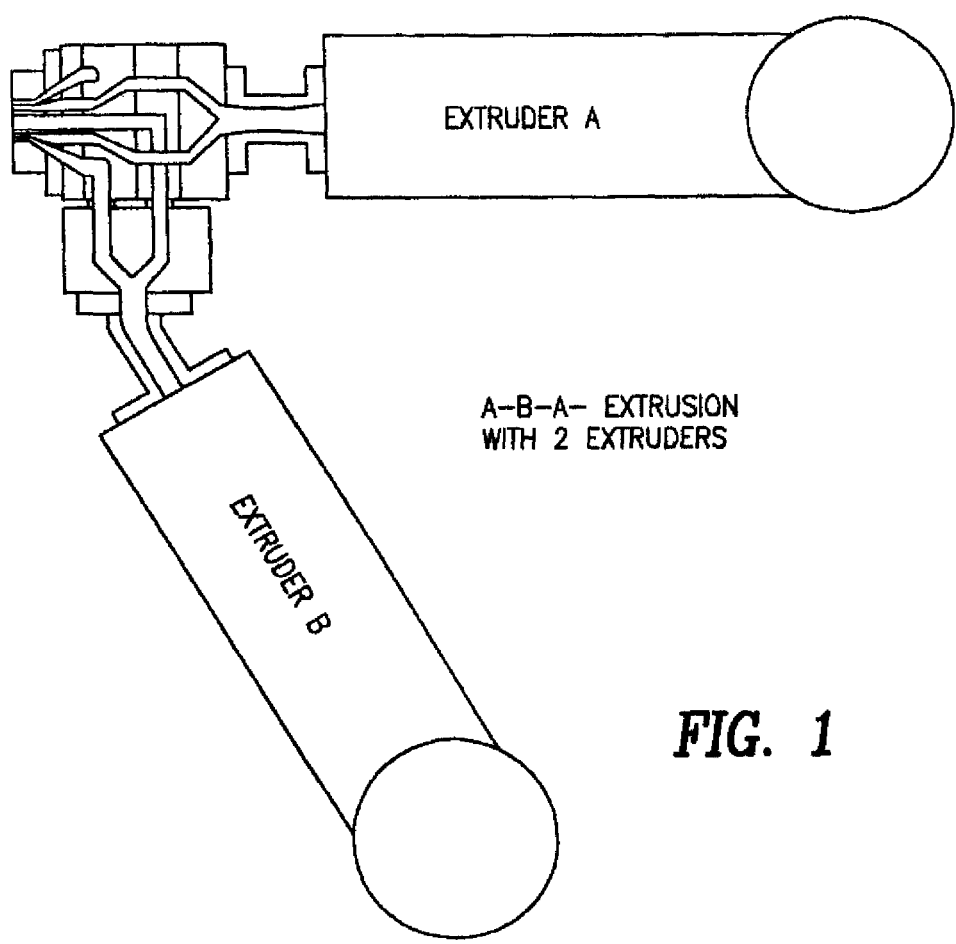
FIG. 1 is a block diagram of a co-extrusion operation using two extruders.

The polymeric formulation of this invention are comprised of (1) about 45 weight percent to about 85 weight percent of a micronized rubber powder, (2) from about 15 weight percent to about 35 weight percent of a metallocene polyolefin elastomer, and (3) from about 1 weight percent to about 10 weight percent of a maleic anhydride grafted polyethylene. The polymeric formulation of this invention can be made by thoroughly mixing the micronized rubber powder, the metallocene polyolefin elastomer, the maleic anhydride grafted polyethylene, and other desired ingredients in a twin screw extruder to attain an essentially homogeneous mixture of the various ingredients. To attain optimal results the ingredients will be dried before being mixed in the extruder. The ingredient are typically dried to a moisture content of less than 0.5 weight percent and are optimally dried to a moisture content of less than 0.1 weight percent.

The micronized rubber powder can be included in the polymeric formulations of this invention at surprisingly high level with excellent physical properties still being maintained. For instance, the micronized rubber powder will typically be included in the polymeric rubber formulations of this invention at a level which is within the range of 50 weight percent to 85 weight percent or at a level which is within the range of 55 weight percent to 85 weight percent. In some applications it is preferred for the micronized rubber powder to be included in the polymeric rubber formulations of this invention at a level which is within the range of 60 weight percent to 80 weight percent or which is within the range of 65 weight percent to 80 weight percent. In some cases it is preferred for the micronized rubber powder to be included in the polymeric rubber formulations of this invention at a level which is within the range of 70 weight percent to 80 weight percent or which is within the range of 72 weight percent to 78 weight percent.

The micronized rubber powders (MRP) utilized in making the polymeric formulations of this invention typically contain a significant fraction of rubber particles having a particle size of less than 100 microns. In any case, such micronized rubber powders can be designated by mesh size as determined by ASTM D-5603. For example, an 80 mesh rubber powder is one in which 90% of particles pass through an 80 mesh screen. There is no defined minimum particle size, therefore the particle size distribution can be quite broad or even multi-modal. Powders in the size range of 40 mesh to 300 mesh are generally considered to be micronized rubber powder.

The reclaimed elastomeric polymers which are used as the raw material for making micronized rubber powder, such as scrap tire rubber, are cured (previously vulcanized) rubbers. They are accordingly relatively inert particles which are essentially non-reactive with virgin elastomers. In one specific embodiment of this invention the micronized rubber can be made utilizing the cryogenic grinding system described in U.S. Pat. No. 7,445,170 or with an impact mill as described in U.S. Pat. No. 7,861,958. The teachings of U.S. Pat. No. 7,445,170 and U.S. Pat. No. 7,861,958 are incorporated herein for purposes of describing useful techniques and equipment which can be employed in making micronized the rubber formulations of this invention. Micronized rubber powder can also be made in many other ways, such as but not limited to a wet grinding process, ambient temperature grinding procedures, and other cryogenic processes. In any case the micronized rubber powder will typically be comprised of a mixture of various cured rubbery polymers including natural rubber, synthetic polyisoprene rubber, emulsion styrene-butadiene rubber, solution styrene-butadiene rubber, styrene-isoprene-butadiene rubber, and a wide variety of additional cured rubbers.

The micronized rubber powder will typically have a particle size which is within the range of 40 Mesh to 300 Mesh. The micronized rubber will normally have a particle size which is within the range of 80 Mesh to 200 Mesh and will preferable be of a particle size which is within the range of 100 Mesh to 160 Mesh. In one embodiment of this invention the micronized rubber can be of a particle size of 80 Mesh with less than 10% by weight of the particles of the micronized rubber powder being capable of passing through a 200 Mesh screen. In another embodiment of this invention the micronized rubber can be of a particle size of 140 Mesh with less than 10% by weight of the particles of the micronized rubber powder being capable of passing through a 200 Mesh screen. A micronized rubber powder that can be utilized in the practice of this invention is MicroDyne 400 which is commercially available from Lehigh Technologies of Tucker, Ga. MicroDyne 400 has a maximum moisture content of 0.5 weight percent, contains from 25 to 35 weight percent carbon black, and has a specific gravity of 1.14±0.03. MicroDyne 400 also has a particle size distribution wherein less than 1% of particle are larger than 600µ and less than 10% are larger than 400µ.

The metallocene polyolefin elastomer will typically be included in the polymeric formulations of this invention at a level which is within the range of 15 weight percent to 45 weight percent and will more typically be included at a level which is within the range of 15 weight percent to 40 weight percent. In many cases the metallocene polyolefin elastomer will be included in the polymeric formulations of this invention at a level which is within the range of 20 weight percent to 35 weight percent or which is within the range of 15 weight percent to 40 weight percent. In one embodiment of this invention the metallocene polyolefin elastomer is included in the polymeric formulations of this invention at a level which is within the range of 22 weight percent to 28 weight percent.

The metallocene polyolefin elastomer will typically be an ethylene/α-olefin interpolymer or a propylene/α-olefin interpolymer. In one embodiment of this invention the metallocene polyolefin elastomer can be a blend of an ethylene/α-olefin interpolymer and a propylene/α-olefin interpolymer.

Although ethylene is not generally characterized as being an α-olefin, as used herein the term propylene/α-olefin interpolymer includes propylene-ethylene interpolymers. Such propylene/α-olefin copolymers are further described in detail in U.S. Pat. No. 6,960,635 and U.S. Pat. No. 6,525, 157. The teaching of U.S. Pat. No. 6,960,635 and U.S. Pat. No. 6,525,157 are incorporated herein by reference for the purpose of describing metallocene polyolefin elastomers which can be used in the practice of this invention. Such propylene/α-olefin copolymers are commercially available from The Dow Chemical Company, under the tradename VERSIFY Elastomers and Plastomers, and from ExxonMobil Chemical Company, under the tradename VISTAMAXX.

In one embodiment, the propylene/α-olefin copolymer, is characterized as having substantially isotactic propylene sequences. The term "substantially isotactic propylene sequences" as used herein means that the sequences have an isotactic triad (mm) measured by $^{13}$CNMR of greater than about 0.85; in the alternative, greater than about 0.90; in another alternative, greater than about 0.92; and in another alternative, greater than about 0.93. Isotactic triads are well-known in the art and are described in, for example, U.S. Pat. No. 5,504,172 and International Publication No. WO 00/01745, which refer to the isotactic sequence in terms of a triad unit in the copolymer molecular chain as determined by $^{13}$CNMR spectra. The teachings of U.S. Pat. No. 5,504, 172 and International Publication No. WO 00/01745 are incorporated herein by reference for the purpose of describing such isotactic triads.

The propylene/α-olefin copolymer may have a melt flow rate in the range of from 0.1 to 25 g/10 minutes, measured in accordance with ASTM D-1238 (at 230° C./2.16 Kg). All individual values and sub-ranges from 0.1 to 25 g/10 minutes are included herein and disclosed herein; for example, the melt flow rate can be from a lower limit of 0.1 g/10 minutes, 0.2 g/10 minutes, or 0.5 g/10 minutes to an upper limit of 25 g/10 minutes, 15 g/10 minutes, 10 g/10 minutes, 8 g/10 minutes, or 5 g/10 minutes. For example, the propylene/α-olefin copolymer may have a melt flow rate in the range of 0.1 to 10 g/10 minutes; or in the alternative, the propylene/α-olefin copolymer may have a melt flow rate in the range of 0.2 to 10 g/10 minutes.

The propylene/α-olefin copolymer has a crystallinity in the range from 1 percent by weight (a heat of fusion of 2 Joules/gram (J/g)) to 30 percent by weight (a heat of fusion of 50 Joules/gram). All individual values and sub-ranges from 1 percent by weight (a heat of fusion of 2 Joules/gram) to 30 percent by weight (a heat of fusion of 50 Joules/gram) are included herein and disclosed herein; for example, the crystallinity can be from a lower limit of 1 percent by weight (a heat of fusion of 2 Joules/gram), 2.5 percent (a heat of fusion of 4 Joules/gram), or 3 percent (a heat of fusion of 5 Joules/gram) to an upper limit of 30 percent by weight (a heat of fusion of 50 Joules/gram), 24 percent by weight (a heat of fusion of 40 Joules/gram), 15 percent by weight (a heat of fusion of 24.8 Joules/gram) or 7 percent by weight (a heat of fusion of 11 Joules/gram). For example, the propylene/α-olefin copolymer may have a crystallinity in the range of from 1 percent by weight (a heat of fusion of 2 Joules/gram) to 24 percent by weight (a heat of fusion of 40 Joules/gram); or in the alternative, the propylene/α-olefin copolymer may have a crystallinity in the range of from 1 percent by weight (a heat of fusion of 2 Joules/gram) to 15 percent by weight (a heat of fusion of 24.8 Joules/gram); or in the alternative, the propylene/α-olefin copolymer may have a crystallinity in the range of from 1 percent by weight (a heat of fusion of 2 Joules/gram) to 7 percent by weight (a heat of fusion of 11 Joules/gram); or in the alternative, the propylene/α-olefin copolymer may have a crystallinity in the range of from 1 percent by weight (a heat of fusion of 2 Joules/gram) to 5 percent by weight (a heat of fusion of 8.3 Joules/gram). The crystallinity is measured via DSC method, as described herein. The propylene/α-olefin copolymer comprises units derived from propylene and units derived from one or more α-olefin comonomers. Exemplary comonomers utilized in the propylene/α-olefin copolymer are $C_4$ to $C_{10}$ α-olefins; for example, $C_4$, $C_6$, and $C_8$ α-olefins. A particularly preferred polyethylene/α-olefin copolymer is metallocene propylene-octene copolymer elastomer.

The propylene/α-olefin copolymer comprises from 1 to 40 percent by weight of one or more α-olefin comonomers, including as previously discussed, ethylene. All individual values and sub-ranges from 1 to 40 weight percent are included herein and disclosed herein; for example, the comonomer content can be from a lower limit of 1 weight percent, 3 weight percent, 4 weight percent, 5 weight percent, 7 weight percent, or 9 weight percent to an upper limit of 40 weight percent, 35 weight percent, 30 weight percent, 27 weight percent, 20 weight percent, 15 weight percent, 12 weight percent, or 9 weight percent. For example, the propylene/α-olefin copolymer comprises from 1 to 35 percent by weight of one or more α-olefin comonomers; or in the alternative, the propylene/α-olefin copolymer comprises from 1 to 30 percent by weight of one or more α-olefin comonomers; or in the alternative, the propylene/α-olefin copolymer comprises from 3 to 27 percent by weight of one or more α-olefin comonomers; or in the alternative, the propylene/α-olefin copolymer comprises from 3 to 20 percent by weight of one or more α-olefin comonomers; or in the alternative, the propylene/α-olefin copolymer comprises from 3 to 15 percent by weight of one or more α-olefin comonomers.

In some embodiments of the invention, the propylene/α-olefin copolymer is propylene/ethylene wherein the ethylene is present in amounts from 9 to 15 weight percent of the total propylene/ethylene copolymer weight. All individual values and sub-ranges from 9 to 16 weight percent are included herein and disclosed herein; for example, the comonomer content can be from a lower limit of 9, 10, 11, 12, 13 or 14 weight percent to an upper limit of 10, 11, 12, 13, 14, or 15 weight percent. For example, the propylene/ethylene copolymer may comprise in a weight percent derived from ethylene of from 9 to 15 weight percent, or in the alternative, from 10 to 14 weight percent or in the alternative, from 11 to 13 weight percent.

The propylene/α-olefin copolymer has a molecular weight distribution (MWD), defined as weight average molecular weight divided by number average molecular weight ($M_w/M_n$) of 3.5 or less; in the alternative 3.0 or less; or in another alternative from 1.8 to 3.0.

In one embodiment of this invention, the propylene-α-olefin copolymers are further characterized as comprising (A) between 60 and less than 100, preferably between 80 and 99 and more preferably between 85 and 99, weight percent units derived from propylene, and (B) between greater than zero and 40, preferably between 1 and 20, more preferably between 4 and 16, and even more preferably between 4 and 15, weight percent units derived from at least one of ethylene and/or a $C_4$-$C_{10}$ α-olefin; and containing an average of at least 0.001, preferably an average of at least 0.005 and more preferably an average of at least 0.01, long chain branches/1000 total carbons, wherein the term long chain branch refers to a chain length of at least one (1) carbon more than a short chain branch, and wherein short chain branch refers to a chain length of two (2) carbons less than the number of carbons in the comonomer. For example, a propylene/1-octene interpolymer has backbones with long chain branches of at least seven (7) carbons in length, but these backbones also have short chain branches of only six (6) carbons in length. The maximum number of long chain branches in the propylene interpolymer is not critical to the definition of this embodiment of the instant invention, but typically it does not exceed 3 long chain branches/1000 total carbons. Such propylene/α-olefin copolymers are further described in details in U.S. Pat. No. 8,420,760; International Publication WO2009/067337A1, and EP0964890B1, each of which is incorporated herein by reference.

The metallocene polyolefin elastomer utilized in the polymeric formulations of this invention can be a single propylene/α-olefin interpolymer or it can be comprise of two or more propylene/α-olefin interpolymers or a combination of two or more embodiments as previously described herein.

The maleic anhydride grafted polyethylene will typically be incorporated into the polymeric formulations of this invention at a level which is within the range of about 1 to about 10 weight percent, based upon the total weight of the polymeric formulation. However, the maleic anhydride grafted polyethylene will more commonly be incorporated into the polymeric formulations of this invention at a level which is within the range of about 2 to about 8 weight percent. The maleic anhydride grafted polyethylene will more commonly be incorporated into the polymeric formulations of this invention at a level which is within the range of about 3 to about 6 weight percent. In most cases the maleic anhydride grafted polyethylene does not provide further benefits at levels of greater than about 5 weight percent. Accordingly, for economic reasons the level of the maleic anhydride grafted polyethylene in the polymeric formulations of this invention will typically not exceed about 5 weight percent. For this reason, it is generally preferred to include the maleic anhydride grafted polyethylene in the polymeric formulations of this invention at a level which is within the range of about 4 weight percent to about 5 weight percent.

The maleic anhydride grafted polyethylene used in the practice of this invention typically has an acid number which is within the range of 5 to 12 mg KOH/gram and more typically has an acid number which is within the range of 6 to 10 mg KOH/gram. In many case it is preferred for the maleic anhydride grafted polyethylene used in the practice of this invention to have an acid number which is within the range of 7 to 9 mg KOH/gram. The maleic anhydride grafted polyethylene used in the practice of this invention will also typically have a Mettler softening point which is within the range of 110° C. to 130° C. as determined by differential scanning calorimetry and a penetration hardness of less than 1 dmm as determined by ASTM D5. The maleic anhydride grafted polyethylene will also typically have a weight average molecular weight ($M_w$) which is within the range of 45,000 to 85,000 and which is more typically within the range of 55,000 to 75,000. For instance, the maleic anhydride grafted polyethylene can have a weight average molecular weight which is within the range of 60,000 to 70,000.

The maleic anhydride grafted polyethylene which can be utilized in the practice of this invention and techniques for the synthesis of such maleic anhydride grafted polyethylene are described in U.S. Pat. No. 5,955,547 and U.S. Pat. No. 6,046,279. The teachings of U.S. Pat. No. 5,955,547 and U.S. Pat. No. 6,046,279 are incorporated by reference herein.

The rubber formulations of this invention can also include a wide variety of standard rubber compounding ingredients including fillers, antioxidants, processing oils, extender oils, resins, colorants, pigments, and the like. For instance, the rubber formulations of this invention can contain fillers, such as carbon black, reinforcing silica, clay, talc, lignin, and the like.

Examples 1-5

In this experiment a series of polymeric formulations were prepared in accordance with this invention and tested to determine physical properties. In the procedure used the ingredients delineated in Table 1 were dried and mixed in a twin screw extruder to attain homogeneous polymeric blends. The polymeric formulations were then processed into dog-bones for determination of physical properties. The properties of the polymeric formulations made are also shown in Table 1.

TABLE 1

| Composition | Example 1 | Example 2 | Example 3 | Example 4 | Example 5 |
| --- | --- | --- | --- | --- | --- |
| Micronized rubber powder (40 mesh) | 75% | 75% | 71.4% | 71.4% | 71.4% |
| Engage ® A1103 ethylene-octene elastomer | 25% | — | 23.8% | — | 11.9% |
| Vistamaxx ™ 6102 ethylene-octene elastomer | — | 25% | — | 23.8% | 11.9% |
| Epolene ® C-26 maleic anhydride grafted polyethylene | — | — | 4.8% | 4.8% | 4.8% |
| Physical Properties | | | | | |
| Tensile Strength @ break (psi) | 221 | 222 | 556 | 607 | 550 |
| Tensile Elongation @ break (%) | 138 | 203 | 251 | 218 | 232 |
| Flexural Modulus (psi) | 428 | 412 | 971 | 3887 | 946 |
| Flexural Strength @ 5% (psi) | 19.0 | 18.5 | 43.7 | 145 | 41.7 |

As can be seen from Table 1, the presence of the maleic anhydride grafted polyethylene in the formulations of this invention greatly enhanced the tensile properties and the flexural strength of the formulations made. The excellent tensile properties and flexural strength attained was surprising in light of the high level of micronized rubber included in the formulations made.

Example 6

One embodiment of this invention includes a mix of micronized rubber from Lehigh Technologies, LLC of 120 Royal Woods Court SW, Tucker, Ga. 30084, and Vistamaxx™ propylene based elastomers from Exxon Mobil Chemical Company, of 13501 Katy Freeway, Houston, Tex. 77079-1398. The invention may also include a combination of color concentrate and compatibilizer from Struktol Corporation, of 201 E. Steels Corners Road, P.O. Box 1649, Stow, Ohio 44224-0649 and a powder form of linear low density polyethylene ("LLDPE"). There are varying degrees of performance and cost targets which may be met adding and subtracting portions of the ingredients of the mix.

The addition of a cap coat with a Vistamaxx 3020™ or equivalent molecular blend/loading allows for adhesion of the two layers in the multi-layer extrusion process and also allows both layers to exhibit like performance of elasticity upon impact. The high density polyethylene ("HDPE") provides a stiffening property to the matrix and may be varied depending upon performance and usage. Higher levels of Vistamaxx™ or similar, may be used depending on the field purpose of the delineator. In addition, varying melt viscosities may be used in any of the layers, depending on performance desired. Construction zone delineators suffer numerous impacts and may or may not require a higher loading or concentration of Vistamaxx™ or equivalent for performance purposes.

It has been determined that micronized powder meshes of all components are optimum in homogenous mixing. It has also been noted that continuous mixing to the throat of the extruder is important to keep a proper proportional balance. In addition, it has also been determined that different melt flow ranges of the materials in the ingredient blend will provide for a homogeneous blend encapsulating the rubber particles and in turn providing performance optimization. It has also been determined that the addition of Maleic Anhydride in the form of MAPE (Maleated Polyethylene), MAPP (Maleated Polypropylene) or maleated natural rubber may enhance the performance characteristics allowing for higher loading content of rubber greater than 50%. This is disclosed in Highly filled thermoplastic elastomers from ground tire rubber, maleated polyethylene and high density polyethylene, by A R Kakroodi and D. Rodriguez, Plastics Rubber and Composites, 2013 Vol. 42, No. 3, page 115-122.

Cap Coat
1. HDPE (Nexeo, 11720 Grand Avenue, Northlake, Ill. 60164)
2. LLDPE (Nexeo)
3. Exxon Mobil Chemical Company, Vistamaxx™ (3020FL Prod pellets)
4. Struktol Co. of America, Stow, Ohio, Rubber Compatibilizer RP 28
5. Color Concentrate Sub Layer Rubber Content
1. Lehigh Technologies micronized rubber powder at 40 mesh
2. ExxonMobil Vistamaxx (3020FL Prod pellets)
3. LLDPE Powder (Nexeo)
4. Struktol Corporation, Compatibilizer RP 28

Testing

The following blend were tested at a 50%+/−2% target focal point for rubber content and performance results based upon a 90 degree flex test.
1) 48% Lehigh Micronized Rubber: 48% Vistamaxx 3020 or equivalent: 2% Struktol Compatibilizer: 2% Color Concentrate
2) 48% Lehigh Micronized Rubber: 36.5% Vistamaxx 3020 or equivalent: 11.5% LLDPE: 2% Struktol Compatibilizer: 2% Color Concentrate
3) 48% Lehigh Micronized Rubber: 24% Vistamaxx 3020 or equivalent: 24% LLDPE: 2% Struktol Compatibilizer: 2% Color Concentrate
4) 48% Lehigh Micronized Rubber: 11.5% Vistamaxx 3020 or equivalent: 36.5% LLDPE: 2% Struktol Compatibilizer: 2% Color Concentrate

*** All blends were encase in a 48/48 blend of HDPE/Vistamaxx 3020 or equivalent Cap Coat with max cap wall of 0.030" to min wall of 0.015", 4% blend of color concentrate and Struktol compatibilizer. Variations of Cap coating ingredients may and or will apply according to impact performance requirements and UV weathering requirements, per customer requirements or filed recommendations.

The chemical names for the above ingredients are:
Micronized Rubber=mixture of natural and synthetic rubbers, carbon black, fillers and oils;
Vistamaxx=propylene-based elastomer;
Compatibilizer=mixture of light color aliphatic hydrocarbon resins.

Method of Mixing Materials

The preceding material blends were measured per weight and percentage calculations using a 5000 lb Fairbanks scale for the heavier components, subtracting tare weight of the container used. The lighter components, color concentrate and compatibilizer, were measured per weight and percentage calculations on a Howe 50 lb capacity scale, subtracting tare weight of the container used. All materials were blended to a uniform blend in a 3000 lb capacity Prater Twin Auger Pulverizer/Mixer and portioned into plastic lined gaylords. Prior to line loading the main extruder, the rubber blend was processed through a Con Air Model D-100A incandescent dehumidifying drier to remove moisture.

Method of Manufacturing

Figure 2:
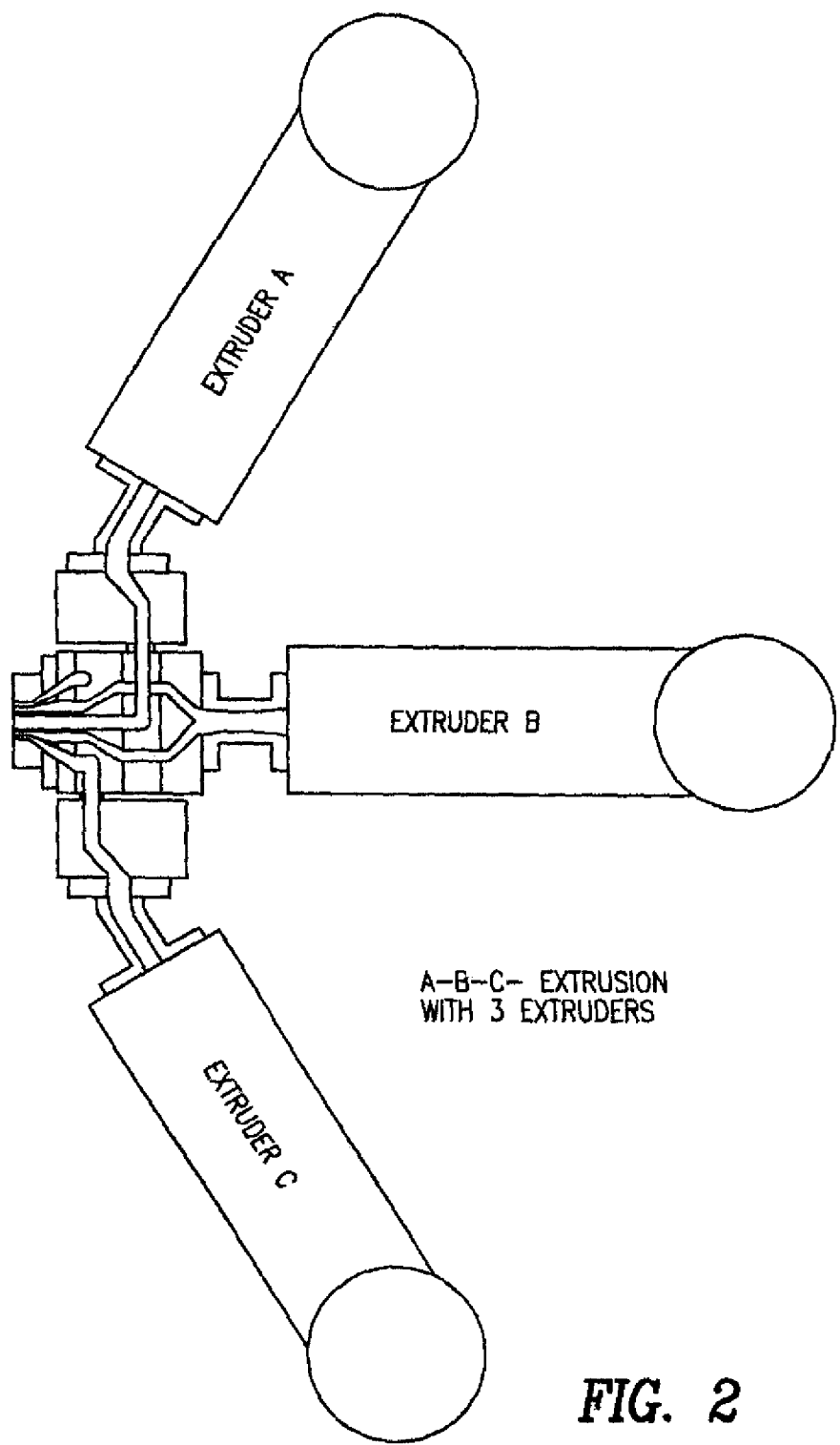
FIG. 2 is a block diagram of a co-extrusion operation using three extruders.

Multi-layer extrusion process was used to fabricate test samples. As show in FIG. 1, extruder B is a 62 centimeter American Maplan Twin Screw Extruder, providing an inner matrix of 48% micronized rubber, 48% Vistmaxx and 4% color concentrate/Struktol compatibilizer blend. Extruder A is a 3½ NRM Single Screw, providing an outer cap coat application of 48% HDPE, 48% Vistamaxx and 4% Color Concentrate and Struktol compatibilizer blend. Processing temperatures were set in accordance to manufacturers' specifications and output speeds. In addition, as show in FIG. 1, the die design/extruder layout may encompass an ABA variant into the processing of a finished part where A is the same material on the outside as the inside and B is the center material of rubber blended composition. As show in FIG. 2, an ABC layered concept may be utilized in the extrusion process, encompassing three or more extruders to provide multiple layers form inside to outside.

NTPEP Testing

The NTPEP (National Transportation Product Evaluation Program) has listed the following work plan for field testing Flexible Ground Mounted Delineator Posts.

Test Procedures:

Sample size of ten units were tested in the following way:

Eight flexible ground mounted posts were installed by the manufacturer (four installed manually and four installed mechanically). The delineators will be hit ten times (four posts for glancing bumper hits and four posts for wheel hits). A standard sedan with a bumper height of approximately 18" while traveling at a speed of 55+/−2 mph will be used for impact testing. Five of the impacts will be at an ambient temperature of 32+/−5 degrees F. and the remaining five impacts at an ambient temperature of 85+/−5 degrees F. The test vehicle shall impact four of the posts at an angle perpendicular to the front of the posts. The same test samples will be used for the ten hits. Two flexible posts will be used for weatherometer testing. A glancing hit is defined as one on the bumper near the vehicle headlight. The delineators shall be installed a minimum of eight hours prior to being hit.

Testing Observations

The testing agent will inspect each post after each impact and document the following:

1. Any splits, cracks, breaks or other forms of deformation or distress.
2. The percent list to vertical two minutes after each impact.
3. The approximate percentage of the reflective area that is damaged after each impact to an extent it no longer performs as intended.
4. Any problems or comments associated with the installation and removal of the posts and bases. The testing agent will document any special equipment or techniques required for installing or removing the posts and bases.

It is a standard test procedure to impact the delineator at a speed of 55 MPH in an automobile at an impact height of 18" (bumper height). The test samples using the composition of the present invention was tested in accordance with the ASTM D2444-99 Standard Test Methods for determining impact resistance on thermoplastic pipe and fittings by means of a TUP (Falling Weight).

The testing apparatus used was in conformance with the apparatus described in Paragraph 4 of the above ASTM Standard Test Method. The drop tube used in accordance with paragraph 4.3.1 was approximately 12 foot in length/height, providing for a fall of at least 11 ft. or 3.3528 meters. The TUP nose detail is shown as TUP A on page 2 of the test procedure. The mass of the TUP weight was 20 lbs.

The velocity of the impact at 57 MPH was calculated as follows:

Formula: The square root of (a+b) yields impact speed in meters per second whereas:
A=Initial Speed=0 (squared)
B=Height Meters×2×9.8 meter/second (squared)
Note: Height=11 feet or 3.3528 meters
B=3.3528 meter×2×9.8 meters squared=644
Square root of 644=25.47
MPH=(square root in meters)×2.2369 or 25.47×2.2369=56.97 MPH Impact Speed Test Specimens Each tube specimen generated for testing measure 6" in length and 0.00" in Outside Dimension. Wall thickness ranged in the 0.165" to 0.175".

A minimum of 20 samples were tested for preliminary tests and a minimum of 100 samples were tested at the optimum level of performance 48% Vistamaxx™.

Specimens were allowed to cool for a period of 24 hours to reach ambient room temperature before being tested. In addition, it was important to gain equal knowledge or performance upon samples that had been placed in a freezer overnight to a temperature of 20 degrees F. Upon removal from the freezer each sample was tested within 60 seconds after removal.

All test specimens including 48% rubber passed the impact TUP test at room temperature and at the 20 degree F. marker; at 120 ft/lbs using ASTM Spec D 2444-99 apparatus. No cracks observed.

Tensile Strength and Elongation

Testing

Bow Tie specimens (performance rated) were cut from extruded delineator post samples for the purpose of evaluating elasticity. Ambient room temperature samples were placed within the Tinius Olsen Locap Electromatic Compression & Tensile Testing Machine apparatus for testing and the elongation speed was set for expansion rate of 2 inches per minute. The 2 inch mark spread to 11 inches before failure and breakage occurred yielding a 1½=450% elongation.

The performance rated bow tie specimens consists of:
Inside Substrate
33% rubber—Pulverized or micronized scrap rubber
67% LDPE—Low density Polyethylene and I.E. PVC, Polyethylene, Polypropylene, ABS, metallocene. ½ pph RP28 (compatibilizer). This component permits extrusion of the rubber and permits it to adhere to another plastic.
Outside Capcoat—LDPE GA 818-073/ExxonMobil 3020FL (but will change depending on the application).

The compatibilizer used is a hydrocarbon resin offered by Struktol Company of America, 201 E. Steels Corners Road, Stow, Ohio, 44224, sold as "Struktol RP28". The rubber is the mixture of natural and synthetic rubbers, carbon black, filler and oils called "Micronized Rubber Powder" sold by Lehigh Technologies, LLC, of 120 Royal Woods Court SW, Tucker, Ga. 30084.

This invention is illustrated by the following examples that are merely for the purpose of illustration and are not to be regarded as limiting the scope of the invention or the manner in which it can be practiced. Unless specifically indicated otherwise, parts and percentages are given by weight.

What is claimed is:

1. A polymeric formulation which is useful as a structural material for manufacturing a wide variety of articles, said polymeric formulation being comprised of (1) about 45 weight percent to about 85 weight percent of a micronized rubber powder, (2) from about 15 weight percent to about 45 weight percent of a metallocene polyolefin elastomer, and (3) from about 1 weight percent to about 10 weight percent of a maleic anhydride grafted polyethylene.

2. The polymeric formulation as specified in claim 1 wherein the micronized rubber powder has a particle size which is within the range of 40 Mesh to 300 Mesh.

3. The polymeric formulation as specified in claim 1 wherein the micronized rubber powder has a particle size of 40 Mesh, wherein less than 10% by weight of the particles of the micronized rubber powder pass through a 200 Mesh screen.

4. The polymeric formulation as specified in claim 1 wherein the micronized rubber powder has a particle size of 40 Mesh, wherein less than 10% by weight of the particles of the micronized rubber powder pass through a 140 Mesh screen.

5. The polymeric formulation as specified in claim 1 wherein the micronized rubber powder has a particle size of 80 Mesh, wherein less than 10% by weight of the particles of the micronized rubber powder pass through a 200 Mesh screen.

6. The polymeric formulation as specified claim 1 wherein the micronized rubber powder has a particle size of 140 Mesh, wherein less than 10% by weight of the particles of the micronized rubber powder pass through a 200 Mesh screen.

7. The polymeric formulation as specified in claim 1 wherein the micronized rubber powder has a particle size which is within the range of 60 Mesh and 160 Mesh.

8. The polymeric formulation as specified in claim 7 wherein less than 10% by weight of the particles of the micronized rubber powder pass through a 200 Mesh screen.

9. The polymeric formulation as specified in claim 1 wherein the micronized rubber powder is present in the polymeric formulation at a level which is within the range of 70 weight percent to 80 weight percent.

10. The polymeric formulation as specified in claim 9 wherein the metallocine polyolefin elastomer is present in the polymeric formulation at a level which is within the range of 20 weight percent to 30 weight percent.

11. The polymeric formulation as specified in claim 10 wherein the metallocine polyolefin elastomer is present in the polymeric formulation at a level which is within the range of 2 weight percent to 6 weight percent.

12. The polymeric formulation as specified in claim 1 wherein the micronized rubber powder is present in the polymeric formulation at a level which is within the range of 72 weight percent to 78 weight percent.

13. The polymeric formulation as specified in claim 12 wherein the metallocine polyolefin elastomer is present in the polymeric formulation at a level which is within the range of 22 weight percent to 28 weight percent.

14. The polymeric formulation as specified in claim 10 wherein the metallocine polyolefin elastomer is present in the polymeric formulation at a level which is within the range of 3 weight percent to 5 weight percent.

15. The polymeric formulation as specified in claim 1 wherein said polymeric formulation have a moisture content of less than 0.5 weight percent.

16. The polymeric formulation as specified in claim 1 wherein said polymeric formulation have a moisture content of less than 0.1 weight percent.

17. An article of manufacture which is comprised of the polymeric formulation of claim 1.

18. The article of manufacture as specified in claim 17 wherein the article of manufacture is a vehicle mud flap.

19. An extrudable flexible composition for use in articles which return to their original shape when deformed comprising: between 1 weight percent and 90 weight percent of a micronized rubber powder, a polyolefin-based elastomer, and a compatabilizer.

20. The extrudable flexible composition as specified in claim 19 wherein the polyolefin-based elastomer is a polypropylene-based elastomer.

21. The extrudable flexible composition as specified in claim 20 wherein the polypropylene-based elastomer is a metallocene polypropylene elastomer.

22. The extrudable flexible composition as specified in claim 21 wherein the micronized rubber powder is present at a level which is within the range of 45 weight percent to about 85 weight percent.

23. An extrudable durable composition which retains its shape in finished products comprising: about 40 weight percent to 60 weight percent of a micronized rubber powder, about 10 weight percent to about 50 weight percent of a polyolefin-based elastomer, about 1 weight percent to about 10 weight percent of a compatabilizer, and about 1 weight percent to about 5 weight percent of a color concentrate.

* * * * *